United States Patent
Black et al.

(10) Patent No.: US 9,118,394 B2
(45) Date of Patent: Aug. 25, 2015

(54) ANTENNA TRANSFER SWITCHING FOR SIMULTANEOUS VOICE AND DATA

(71) Applicant: Google Technology Holdings LLC, Mountain View, CA (US)

(72) Inventors: Gregory R. Black, Vernon Hills, IL (US); Graham R. Alvey, Skokie, IL (US); Minh H. Duong, Lake Bluff, IL (US); Jatin A. Kulkarni, Wheeling, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 200 days.

(21) Appl. No.: 13/716,319

(22) Filed: Dec. 17, 2012

(65) Prior Publication Data
US 2014/0170990 A1 Jun. 19, 2014

(51) Int. Cl.
H04B 1/40 (2006.01)
H04M 1/00 (2006.01)
H04B 1/401 (2015.01)

(52) U.S. Cl.
CPC .................................... H04B 1/401 (2013.01)

(58) Field of Classification Search
CPC .... H04B 1/401; H04B 7/0608; H04B 7/0639; H04B 7/0802; H04B 7/082; H04B 1/0064; H04B 7/0404; H04B 7/0602; H04B 7/0808; H04B 1/005
USPC ............ 455/77, 78, 550.1, 552.1, 553.1, 132, 455/133, 134, 135, 188.1, 193.1, 435.3, 455/512, 166.2; 375/349
See application file for complete search history.

(56) References Cited

U.S. PATENT DOCUMENTS

| | | | |
|---|---|---|---|
| 6,035,183 A | 3/2000 | Todd et al. | |
| 6,529,746 B1 | 3/2003 | Kotzin | |
| 6,871,052 B2 | 3/2005 | Spencer et al. | |
| 7,356,025 B2 * | 4/2008 | Bohm | 370/388 |
| 7,643,463 B1 * | 1/2010 | Linsky et al. | 370/344 |
| 8,154,365 B2 | 4/2012 | Chan et al. | |
| 2004/0029619 A1 * | 2/2004 | Liang et al. | 455/562.1 |
| 2004/0087332 A1 | 5/2004 | Monroe et al. | |
| 2004/0204035 A1 * | 10/2004 | Raghuram et al. | 455/553.1 |

(Continued)

OTHER PUBLICATIONS

Douglas Rathburn, Avoid Common Switching System Problems, Test & Measurement World, Jan. 1, 2000, all pages.

*Primary Examiner* — Andrew Wendell
(74) *Attorney, Agent, or Firm* — Faegre Baker Daniels LLP

(57) ABSTRACT

A method and system selects an antenna for signal propagation within a wireless communication device having multiple antennas. A transfer switch controller identifies an operating mode being initiated on the wireless communication device. The transfer switch controller configures a dynamic transfer switch based on the operating mode initiated to support propagation of each available type of communication signal. In addition, the transfer switch controller utilizes a pre-established priority of each available type of communication signal to select the appropriate antenna. The transfer switch controller communicatively connects, utilizing the configured dynamic transfer switch, each of at least one transceiver associated with the operating mode initiated to a specific antenna, where each transceiver supports propagation of a specific type of communication signal. As a result, the transfer switch controller enables each of the at least one communication signal to be propagated via a specific antenna selected using the configured dynamic transfer switch.

20 Claims, 8 Drawing Sheets

(56) References Cited

U.S. PATENT DOCUMENTS

| | | | |
|---|---|---|---|
| 2005/0212708 A1* | 9/2005 | Fifield | 343/702 |
| 2010/0022192 A1 | 1/2010 | Knudsen et al. | |
| 2012/0184228 A1* | 7/2012 | Mujtaba et al. | 455/103 |
| 2014/0308957 A1* | 10/2014 | Tiwari et al. | 455/436 |

* cited by examiner

ANTENNA TRANSFER SWITCHING FOR SIMULTANEOUS VOICE AND DATA

BACKGROUND

1. Technical Field

The present disclosure relates in general to wireless communication devices, and relates in particular to radio frequency (RF) signal propagation in multi-antenna wireless communication devices.

2. Description of the Related Art

With an ever increasing demand for higher data rates accompanied by an increasing demand for higher signal quality, wireless communication systems have been increasingly employing various diversity antenna arrangements. In simultaneous voice and data (SVD) operations, separate antennas are generally used for voice and data. However, there may not be enough physical volume available to have two high performance antennas. As a result, system designers are still tasked with overcoming the challenges associated with signal quality even in these diversity arrangement configurations. Additionally, there is a need to avoid the occurrence of receiver desensitization due to inter-modulation of the simultaneously transmitted signals.

BRIEF DESCRIPTION OF THE DRAWINGS

The described embodiments are to be read in conjunction with the accompanying drawings, wherein.

DETAILED DESCRIPTION

Figure 1:
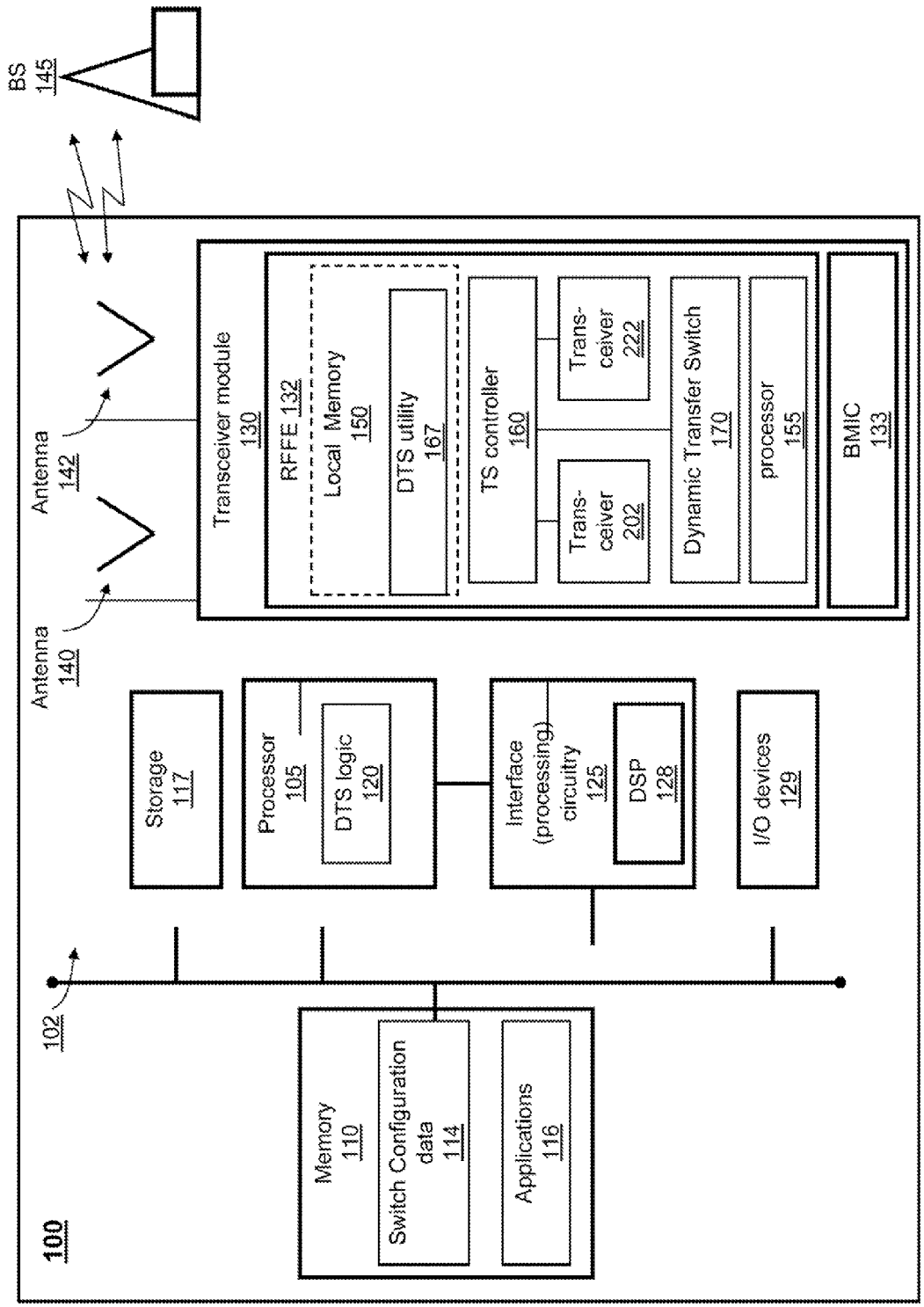
FIG. 1 is a block diagram illustrating an example wireless communication device within which the various features of the described embodiments can be advantageously implemented, according to one embodiment.

The illustrative embodiments provide a method and system for selecting an antenna for signal propagation within a wireless communication device having multiple antennas. A transfer switch controller identifies an operating mode being initiated on the wireless communication device. The transfer switch controller configures a dynamic transfer switch based on the operating mode initiated to support propagation of each available type of communication signal. In addition, the transfer switch controller utilizes a pre-established priority of each available type of communication signal to select the appropriate antenna. The transfer switch controller communicatively connects, utilizing the configured dynamic transfer switch, each of at least one transceiver associated with the operating mode initiated to a specific antenna, where each transceiver supports propagation of a specific type of communication signal. As a result, the transfer switch controller enables each of the at least one communication signal to be propagated via a specific antenna selected using the configured dynamic transfer switch.

In the following detailed description of exemplary embodiments of the disclosure, specific exemplary embodiments in which the various aspects of the disclosure may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein.

With specific reference now to FIG. 1, there is depicted a block diagram of an example wireless communication device 100, within which the functional aspects of the described embodiments may be implemented. Wireless communication device 100 represents a device that is adapted to transmit and receive electromagnetic signals over an air interface via uplink and/or downlink channels between the wireless communication device 100 and communication network equipment (e.g., base-station 145) utilizing a plurality of different communication standards, such as Global System for Mobile Communications (GSM), Code Division Multiple Access (CDMA), Orthogonal Frequency Division Multiple Access (OFDMA), Long Term Evolution (LTE) and similar systems. In one or more embodiments, the wireless communication device can be a mobile cellular device/phone or smartphone, or laptop, netbook or tablet computing device, or other types of communications devices. Wireless communication device 100 comprises processor 105 and interface circuitry 125, which are connected to memory component 110 via signal bus 102. Interface circuitry 125 includes digital signal processor (DSP) 128. Wireless communication device 100 also includes a transceiver module 130 for sending and receiving communication signals. In at least some embodiments, the sending and receiving of communication signals occur wirelessly and are facilitated by one or more antennas 140 and 142 coupled to the transceiver module 130. The number of antennas can vary from device to device, ranging from a single antenna to two or more antennas, and the presentation within wireless communication device 100 of two antennas 140 and 142 is merely for illustration.

Wireless communication device 100 is able to wirelessly communicate to base-station 145 via antenna 140/142. Base station 145 can be any one of a number of different types of network stations and/or antennas associated with the infrastructure of the wireless network and configured to support uplink and downlink communication via one or more of the wireless communication protocols, as known by those skilled in the art.

Transceiver module 130 comprises baseband modem integrated circuit (BMIC) 133 and radio frequency front end (RFFE) (module) 132. In one embodiment, RFFE 132 comprises RF transceivers 202/222, local memory 150, processor 155, dynamic transfer switch (DTS) utility 167, dynamic transfer switch 170, and transfer switch controller 160. In one embodiment, transceiver module 130 also includes local processor 155, which can be described as a digital signal processor (DSP). According to one aspect of the disclosure, local memory/storage 150 includes therein firmware, such as Dynamic Transfer Switch (DTS) utility 167, which supports the various processing functions of transceiver module 130. The structural makeup of transceiver module 130 is described in greater detail in FIG. 2.

In addition to the above described hardware components of wireless communication device 100, various features of the invention may be completed or supported via software (or firmware) code and/or logic stored within at least one of memory 110 and local memory 150, and respectively executed by DSP 128, processor 105, or local processor 155 of transceiver module 130. Thus, for example, illustrated within memory 110 and/or local memory 150 are a number of software/firmware/logic components/modules, including transfer switch configuration data 114, applications 116 and DTS utility 167.

The various components within wireless communication device 100 can be electrically and/or communicatively coupled together as illustrated in FIG. 1. As utilized herein, the term "communicatively coupled" means that information signals are transmissible through various interconnections between the components. The interconnections between the components can be direct interconnections that include conductive transmission media, or may be indirect interconnections that include one or more intermediate electrical components. Although certain direct interconnections are illustrated in FIG. 1, it is to be understood that more, fewer or different interconnections may be present in other embodiments.

Figure 2:
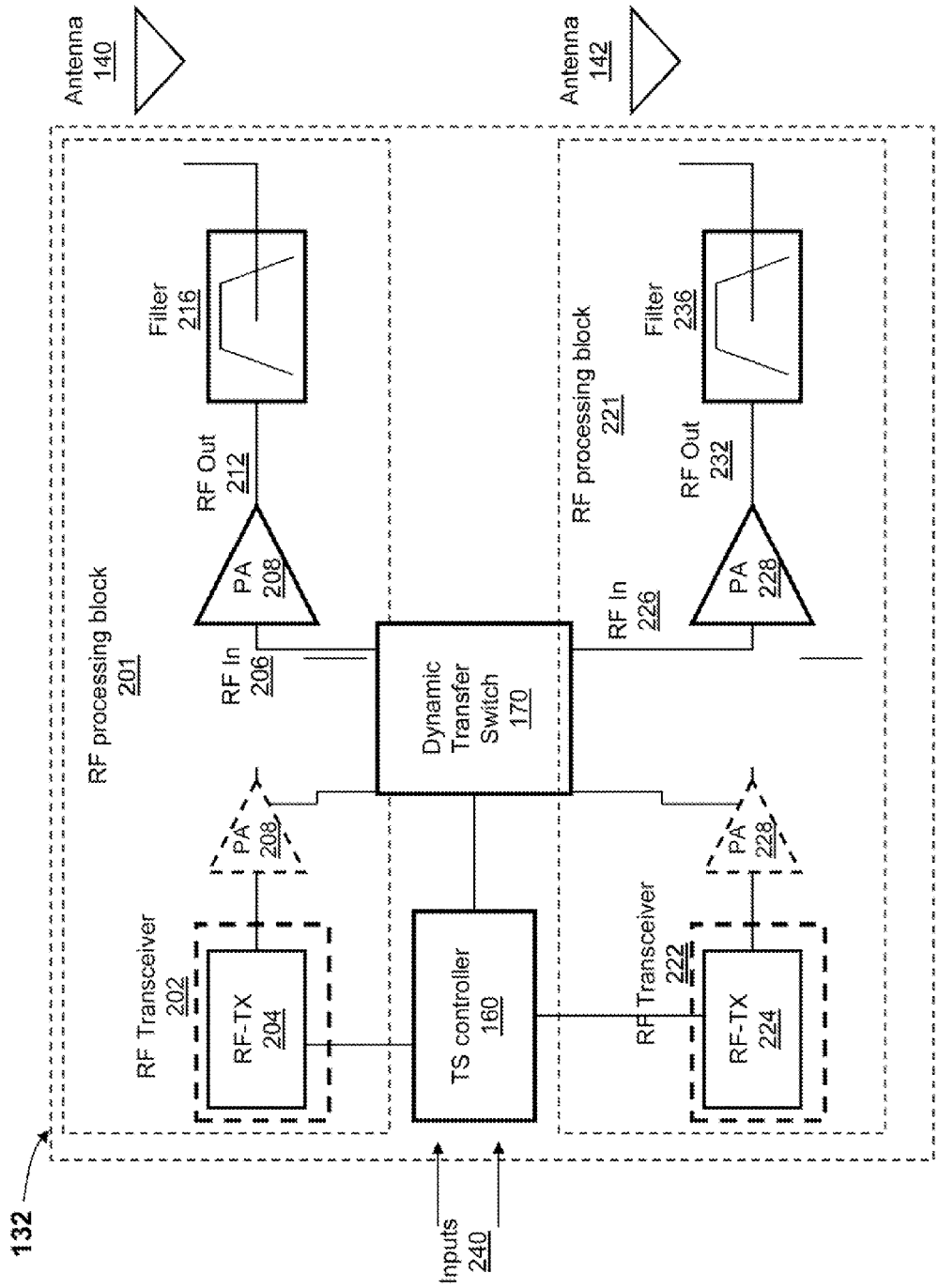
FIG. 2 provides a block diagram representation of a structural configuration of radio frequency front end (RFFE) 132 comprising a dynamic transfer switch and a transfer switch controller, according to one embodiment.

FIG. 2 provides a block diagram representation of a structural configuration of radio frequency front end (RFFE) 132 comprising a dynamic transfer switch 170 and a transfer switch controller 160 that selectively configures the dynamic transfer switch 170, according to one embodiment. RFFE 132 comprises first radio frequency (RF) processing block 201, second RF processing block 221 and dynamic transfer switch 170. In addition, RFFE 132 includes transfer switch controller 160 which manages an operation of dynamic transfer switch 170. In particular, transfer switch controller 160 provides logic and timing control associated with selectively configuring dynamic transfer switch 170. First radio frequency (RF) processing block 201 comprises first RF transceiver 202 and first power amplifier 208 which are each coupled to respective ports of dynamic transfer switch 170. Also illustrated in first radio frequency (RF) processing block 201 is first transmit filter 216 which is coupled to an output port of power amplifier 208. In addition, first transmit filter 216 is coupled to first antenna 140.

Second radio frequency (RF) processing block 221 comprises second RF transceiver 202 and second power amplifier 228 which are each coupled to respective ports of dynamic transfer switch 170. Also illustrated in second radio frequency (RF) processing block 221 is second transmit filter 236 which is coupled to an output port of power amplifier 228. In addition, second transmit filter 236 is coupled to second antenna 142.

Signal switching of the PA 208, 228 input signals 206, 226 is generally preferred because the insertion loss has less of an effect on power efficiency, compared to switching of the signal at the output of the PA 212, 232. However because of complications arising from gain calibration of the RF transmitter operating with different power amplifiers, it may be preferable to employ signal switching at the PA output.

A first circuit configuration places first power amplifier 208 in first RF processing block 201 and second power amplifier 228 in second RF processing block 221 between dynamic transfer switch 170 and a respective duplex filter. Alternative circuit positions for first power amplifier 208 and second power amplifier 228 provided by a second circuit configuration are also illustrated. These alternative positions which place each of the power amplifiers between a respective transceiver and dynamic transfer switch 170 are indicated with dashed line outline representations for first power amplifier 208 and second power amplifier 228.

In another alternative circuit position duplexers 216, 236 can also be placed between the respective transceiver and dynamic transfer switch. Transfer switch controller 160 provides signal switching of input signals 206 and 226 of first power amplifier 208 and second power amplifier 228 associated with the first circuit configuration. Alternatively, transfer switch controller 160 provides signal switching of RF output signals 212 and 232 of first power amplifier 208 and second power amplifier 228 associated with the second circuit configuration. Switching of RF input signals 206 and 226 generally provides lower insertion loss resulting in a higher power efficiency compared to a higher signal loss and lower power efficiency provided by switching of RF output signals 212 and 232. However, gain calibration for a transceiver and a corresponding power amplifier(s) is simpler in the second circuit configuration associated with switching of RF output signals 212 and 232 compared with the first circuit configuration associated with a switching of input signals 206 and 226. In another implementation, filters 216 and 236 can be placed in alternative circuit positions (not shown) between a respective alternatively positioned power amplifier and dynamic transfer switch 170. Transfer switch controller 160 provides a mechanism for selecting an antenna for signal propagation within a wireless communication device having multiple antennas. Transfer switch controller 160 detects initiation of the operating mode and identifies the detected operating mode to initiate an antenna selection process. In response to identifying the detected operating mode, transfer switch controller 160 configures dynamic transfer switch 170 based on the operating mode initiated to support propagation of each available type of communication signal by an antenna providing a specific performance. Transfer switch controller 160 communicatively connects, utilizing the configured dynamic transfer switch 170, each of at least one transceiver associated with the operating mode initiated to a specific antenna, where each transceiver supports propagation of a specific type of communication signal. As a result, transfer switch controller 160 enables each of the at least one communication signal to be propagated via a specific antenna selected using the configured dynamic transfer switch.

In one embodiment, transfer switch controller 160 identifies from among at least two antennas a first antenna selected based on performance characteristics, i.e., the antenna providing a "better performance". In one embodiment, the "better performance" correlates to a level of improvement during signal propagation in antenna performance of a first antenna over one or more second antenna(s). In one embodiment, inputs 240 includes information that transfer switch controller 160 receives about antenna performance. In one or more implementations, transfer switch controller 160 uses antenna efficiency, total radiated power or some other antenna performance measurements/metrics to determine antenna performance, such as specific absorption ration (SAR). The antenna performance consideration can vary depending on a present operating mode, and from the inferred user position relative to the antennas. The user position can also be inferred from the presently running applications, or more directly, from position measurements based on sensors, such as infrared (IR) position sensors or capacitive touch sensors. In addition, transfer switch controller 160 determines a type for each communication signal associated with the current operating mode. In one embodiment, a communication signal is identified as one of a voice signal which represents a first type of communication signal and a data signal which represents a second type of communication signal. In one embodiment, the first type of communication signal has a high priority and the second type of communication signal has a low priority.

In response to determining that the currently initiated operating mode provides only a single communication signal identified as a specific type of communication signal, transfer switch controller 160 propagates the (single) communication signal using the better performing antenna. In particular, in response to the first antenna being identified as the better performing antenna, if the current operating mode exclusively provides a single communication signal identified as having a voice signal type, transfer switch controller 160 propagates the voice signal using the first antenna. For example, in the voice-only transmission mode in which a single RF voice signal is provided by a single transceiver (e.g., first transceiver 202), first transceiver 202 operates as a voice transceiver providing the single RF voice signal which transfer switch controller 160 propagates to first antenna 140 using dynamic transfer switch 170. In a simultaneous voice-only transmission mode in which at least two independent RF voice signals are provided by a single transceiver (e.g., first transceiver 202), first transceiver 202 provides the at least two independent RF voice signals, which transfer switch controller 160 propagate to first antenna 140 using dynamic transfer switch 170.

In response to determining that the operating mode initiated provides a single data signal, transfer switch controller 160 propagates the data signal using first antenna 140, which first antenna has been identified as the better performing antenna. For example, second transceiver 222 exclusively operating as a data transceiver is able to propagate, using dynamic transfer switch 170, a single data signal in a single data signal mode or at least two data signals in a simultaneous data signal mode to first antenna 140. However, in response to determining that the operating mode initiated is a simultaneous data only transmission mode such as carrier aggregation which provides at least two data signals from respective transceivers, transfer switch controller 160 communicatively couples first RF transceiver 202 (i.e., operating as a first data transceiver) to first antenna 140 to propagate a first data signal(s) to first antenna 140. Furthermore, transfer switch controller 160 communicatively couples second RF transceiver 222 (i.e., operating as a second data transceiver) to second antenna 142 to propagate a second data signal(s) to second antenna 142 using dynamic transfer switch 170.

Simultaneous data only mode (e.g., Carrier Aggregation) provides a first data signal(s) having a higher priority and a second data signal(s) having a lower priority from first RF transceiver 202 and second RF transceiver 222, respectively. Based on the respective signal priorities, the first data signal(s) and the second data signal(s) are assigned to antennas selected based on antenna performance. In one embodiment, the first data signal(s) can be assigned a higher priority than the second data signal(s) based on a composition of each respective "data signal". For example, in one configuration, the first data signal(s) comprises a voice and data signal referred to as "voice over data". Because of the "voice component" within the first data signal(s), the first data signal(s) is assigned a higher priority than the second data signal(s).

In one embodiment, in response to determining that the initiated operating mode simultaneously provides at least two different types of communication signals including a first type of communication signal (e.g., a voice signal) having a high priority and a second type of communication signal (e.g., a data signal) having a low priority, transfer switch controller 160 communicatively couples first RF transceiver 202 (e.g., operating as a voice transceiver) to first antenna 140 identified as a better performing antenna and couples second RF transceiver 222 (e.g., operating as a data transceiver) to second antenna 142 identified as a lower performing antenna to propagate at least one communication signal of the first type (e.g., a voice signal) using first antenna 140 and at least one communication signal of the second type (e.g., a data signal) using second antenna 142. As a result, in a simultaneous voice and data transmission mode, transfer switch controller 160 propagates a higher priority, voice signal to a better performing antenna (i.e., first antenna 140) and a lower priority, data signal to second antenna 142 which provides a relatively lower antenna performance compared with first antenna 140. Signal priority for the presently running applications can be determined by performance requirements for the presently running applications, such as latency and/or quality of service (QoS) requirements.

Transfer switch controller 160 communicatively couples a transceiver to a specific antenna by selectively opening and closing signal paths provided by respective switch components/devices within dynamic transfer switch 170. An antenna selection mechanism as well as other functions of transfer switch controller 160 and the features and components of dynamic transfer switch 170 are described in further detail in FIG. 3.

Figure 3:
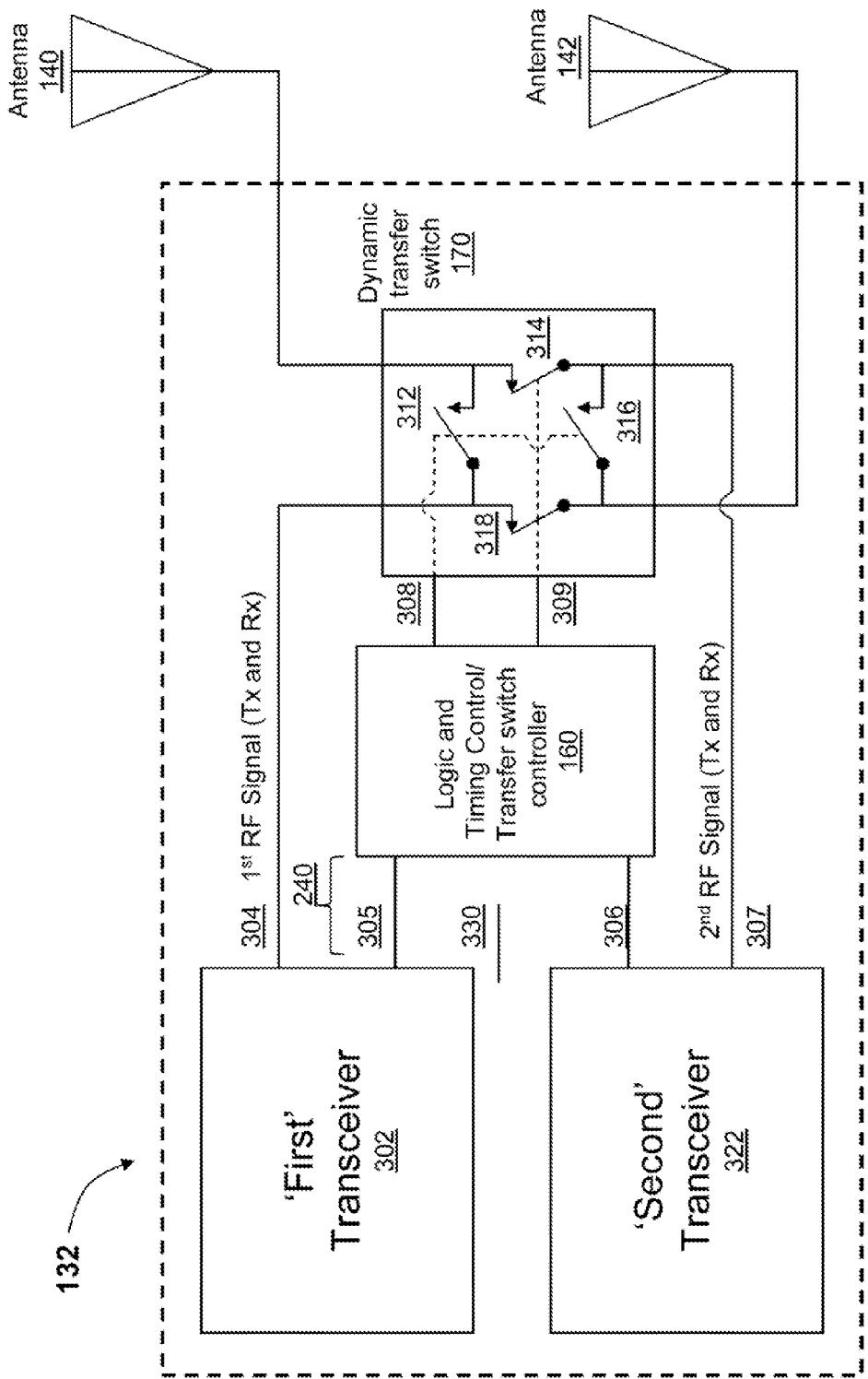
FIG. 3 is a block diagram illustrating a first embodiment of Radio Frequency Front End (RFFE) 132 comprising a dynamic transfer switch and a transfer switch controller within a wireless communication device.
Figure 5:
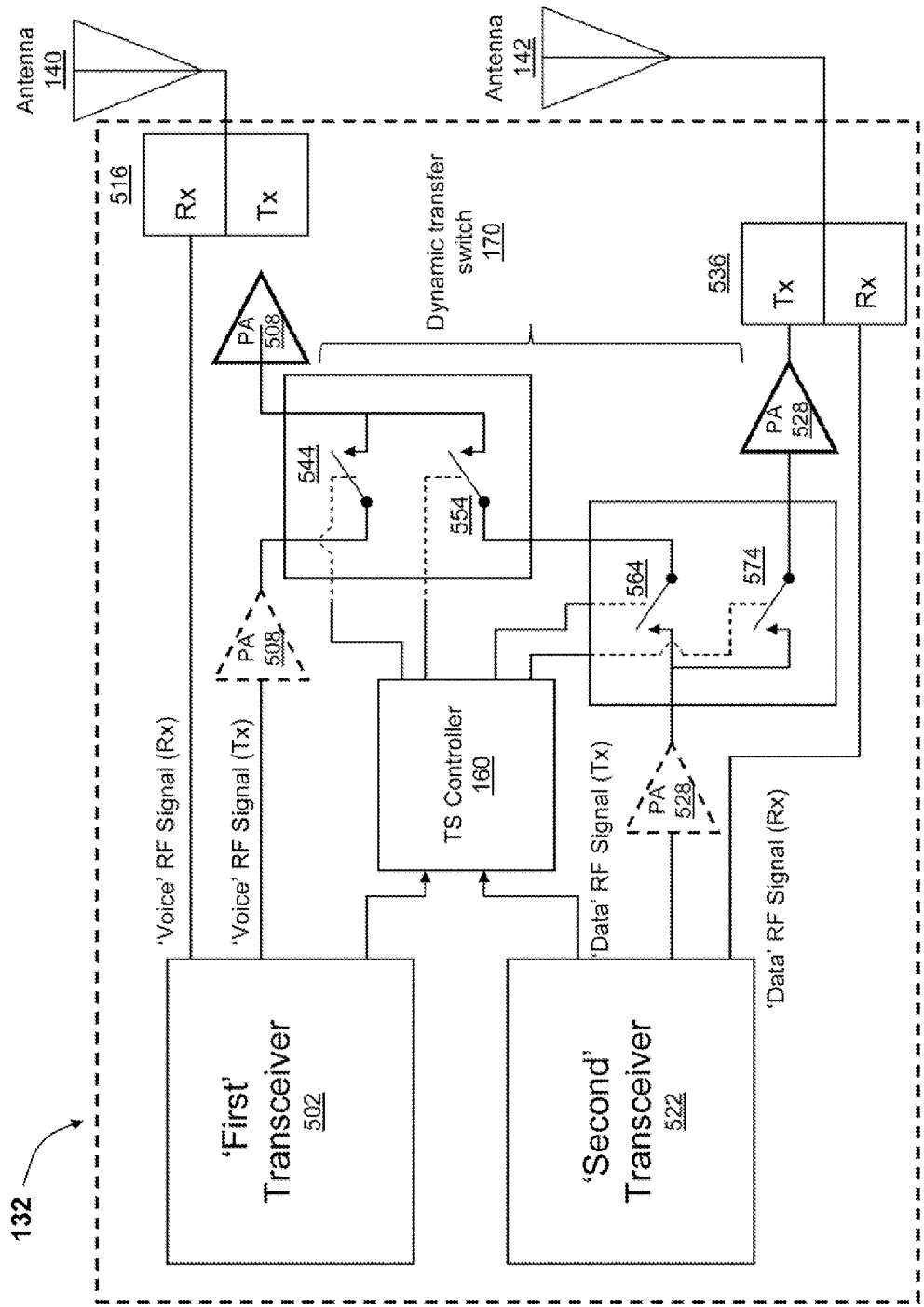
FIG. 5 is a block diagram illustrating a third embodiment of Radio Frequency Front End (RFFE) 132 comprising a dynamic transfer switch and a transfer switch controller within a wireless communication device.

FIG. 3 is a block diagram illustrating a first embodiment of Radio Frequency Front End (RFFE) Module 132 comprising a dynamic transfer switch 170 and a transfer switch (TS) controller 170160 which selectively configures the dynamic transfer switch, according to one embodiment. RFFE 132 comprises first transceiver 302 and second transceiver 322 which are both coupled electronically to TS controller 160. In addition, RFFE 132 also comprises dynamic transfer switch 170 which is coupled to transfer switch controller 160 which provides control signals to dynamic transfer switch 170. Transfer switch controller 160 is coupled to both first transceiver 302 and second transceiver 322 from which transfer switch controller 160 receives information 305 and 306 (e.g., information about a current operating mode and/or a currently initiated operating mode). Transfer switch controller 160 uses information 305/306 to configure dynamic transfer switch 170. In one embodiment, first transceiver 302 includes a first power amplifier (not shown) and a first duplexer (not shown) and second transceiver 322 includes a second power amplifier (not shown) and a second duplexer (not shown). Each of the first duplexer and the second duplexer has an input/output (I/O) port that is shared by transmit and receive signals. As illustrated in FIG. 3, first transceiver 302 provides a single RF signal port that is shared by both transmit and receive signals. In one embodiment, the single RF signal port (e.g., port 304) provided by first transceiver 302 is coupled to the (I/O) port of the first duplexer located within first transceiver 302. Similarly, the single RF signal port (e.g., port 307) provided by second transceiver 322 is coupled to the (I/O) port of the second duplexer located within second transceiver 322. The inclusion of power amplifiers and duplex filters within transceivers 302 and 322 provides one of several illustrative differences between the configuration of FIG. 3 and subsequently presented configurations of FIGS. 5 and 6. For example, FIG. 5 presents a configuration in which first power amplifier 508, second power amplifier 528, and the corresponding duplex filters are respectively located outside of transceivers 502 and 522.

Figure 4:
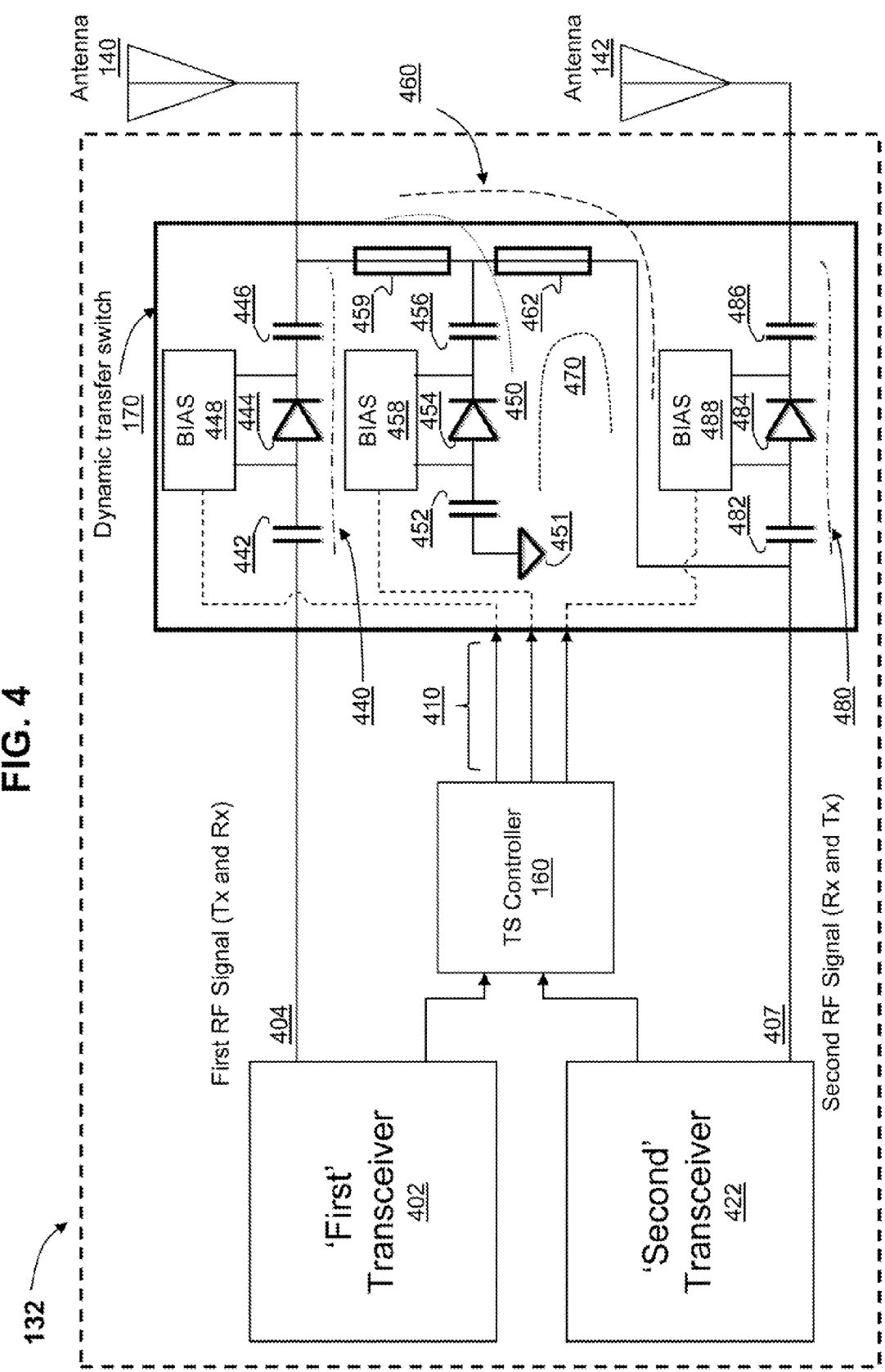
FIG. 4 is a block diagram illustrating a second embodiment of Radio Frequency Front End (RFFE) 132 comprising a dynamic transfer switch and a transfer switch controller within a wireless communication device.

In the switch configuration of FIG. 3, dynamic transfer switch 170 comprises multiple switch devices including first switch device 312, second switch device 314, third switch device 316 and fourth switch device 318. Each of first switch device 312, second switch device 314, third switch device 316 and fourth switch device 318 individually represents a single pole single throw switch. Furthermore, transfer switch controller 160 selectively configures these switch devices to effectively provide one of (a) a respective signal path for connecting a transceiver to a specified antenna and (b) an open circuit which prevents an RF signal from being propagated to a particular antenna. Transfer switch controller 160 sends a control signal to a specific switch device to selectively open or close a respective signal path. In FIG. 3, each switch device shares a control signal with another switch device. For example, transfer switch controller 160 sends first, shared control signal 308 to first switch device 312 and third switch device 316. As a result of a shared control signal, first switch device 312 and third switch device 316 are either both open or both closed at any particular time. In addition, transfer switch controller 160 sends second, shared control signal 309 to second switch device 314 and fourth switch device 318. As further illustrated, dynamic transfer switch 170 represents a double pole double throw (DPDT) switch. The "poles" correspond to respective I/O ports of first and second transceivers 302 and 322. The "throws" correspond to communicative connections to first and second antennas 140 and 142, respectively. In one embodiment, the double pole double throw (DPDT) switch is provided by two single pole double throw (SPDT) switches. In a related embodiment, an SPDT switch is provided by two single pole single throw (SPST) switches. In at least one implementation, a SPST switch is implemented using a PIN diode, as shown in FIG. 4.

Transfer switch controller 160 provides a mechanism for selecting an antenna for signal propagation within a wireless communication device having multiple antennas. In one embodiment, transfer switch controller 160 identifies from among at least two antennas an antenna providing a better performance. In one embodiment, inputs 240 include information 305/306 as well as additional information 330 that transfer switch controller 160 receives about antenna performance. In response to the first antenna being identified as the better performing antenna, if the current operating mode provides only a voice signal type for each of the associated communication signals, transfer switch controller 160 propagates all of the at least one communication signal using the first antenna. For example, in a voice-only transmission mode in which a single RF voice signal is provided by a single transceiver (e.g., first transceiver 302), first transceiver 302 operates as a voice transceiver providing the single RF voice signal which transfer switch controller 160 propagates to first antenna 140 using first switch device 312.

In response to determining that the operating mode initiated is a data only mode that provides a single data signal, transfer switch controller 160 propagates the (single) data signal using first antenna 140. For example, second transceiver 322 exclusively operating as a data transceiver is able to propagate, using dynamic transfer switch 170, a single data signal in a single data signal mode to first antenna 140 using second switch device 314. RFFE 132 can also be configured for a simultaneous data only mode such as Carrier Aggregation. In general, the simultaneous data only mode utilizes multiple operating transceivers and provides a first data signal(s) having a higher priority and a second data signal(s) having a lower priority from first transceiver 302 and second transceiver 322, respectively. However, in response to determining that the operating mode initiated is identified as a simultaneous data only mode such as carrier aggregation, transfer switch controller 160 communicatively couples first transceiver 302 (i.e., operating as a first data transceiver) to first antenna 140 identified as the better performing antenna to propagate a first data signal(s) to first antenna 140 using first switch device 312. Furthermore, transfer switch controller 160 communicatively couples second transceiver 322 (i.e., operating as a second data transceiver) to second antenna 142 identified as the lesser performing antenna to propagate a second data signal(s) to second antenna 142 using third switch device 316. In one embodiment, if both communication signals in a simultaneous transmission mode have substantially identical priorities, signals are routed to antennas based on a default specification.

In one embodiment, in response to determining that the operating mode initiated simultaneously provides at least two different types of communication signals including a first type of communication signal having a high priority and a second type of communication signal having a low priority, transfer switch controller 160 communicatively couples first transceiver 302 (e.g., operating as a voice transceiver) to first antenna 140 and second transceiver 322 (e.g., operating as a data transceiver) to second antenna 142 to propagate at least one communication signal of the first type (e.g., a voice signal) using the first antenna and at least one communication signal of the second type (e.g., a data signal) using the second antenna, the first antenna being identified as the better performing antenna.

In response to second antenna being identified as the better performing antenna, transfer switch controller 160 configures dynamic transfer switch 170 to communicatively couple a first transceiver 302 to second antenna 142, using fourth switch device 318, when first transceiver 302 operates as a voice transceiver. In a simultaneous voice and data mode, transfer switch controller 160 configures dynamic transfer switch 170 to communicatively couple (a) a first transceiver 302 to second antenna 142, using fourth switch device 318, when first transceiver 302 operates as a voice transceiver and (b) a second transceiver 322 to first antenna 140, using second switch device 314, when second transceiver 322 operates as a data transceiver. In a data-only mode, transfer switch controller 160 configures dynamic transfer switch 170 to communicatively couple a second transceiver 322 to second antenna 140 (i.e., currently the better performing antenna), using third switch device 316, when second transceiver 322 exclusively operates as a data transceiver. In carrier aggregation mode, transfer switch controller 160 communicatively couples first transceiver 302 (i.e., operating as a first data transceiver) to second antenna 142 using fourth switch device 318. Furthermore, transfer switch controller 160 communicatively couples second transceiver 322 (i.e., operating as a second data transceiver) to first antenna 140 using second switch device 314. In this way, transfer switch controller 160 controls the dynamic transfer switch 170 to route the high priority signal to the higher performing antenna.

Figure 6:
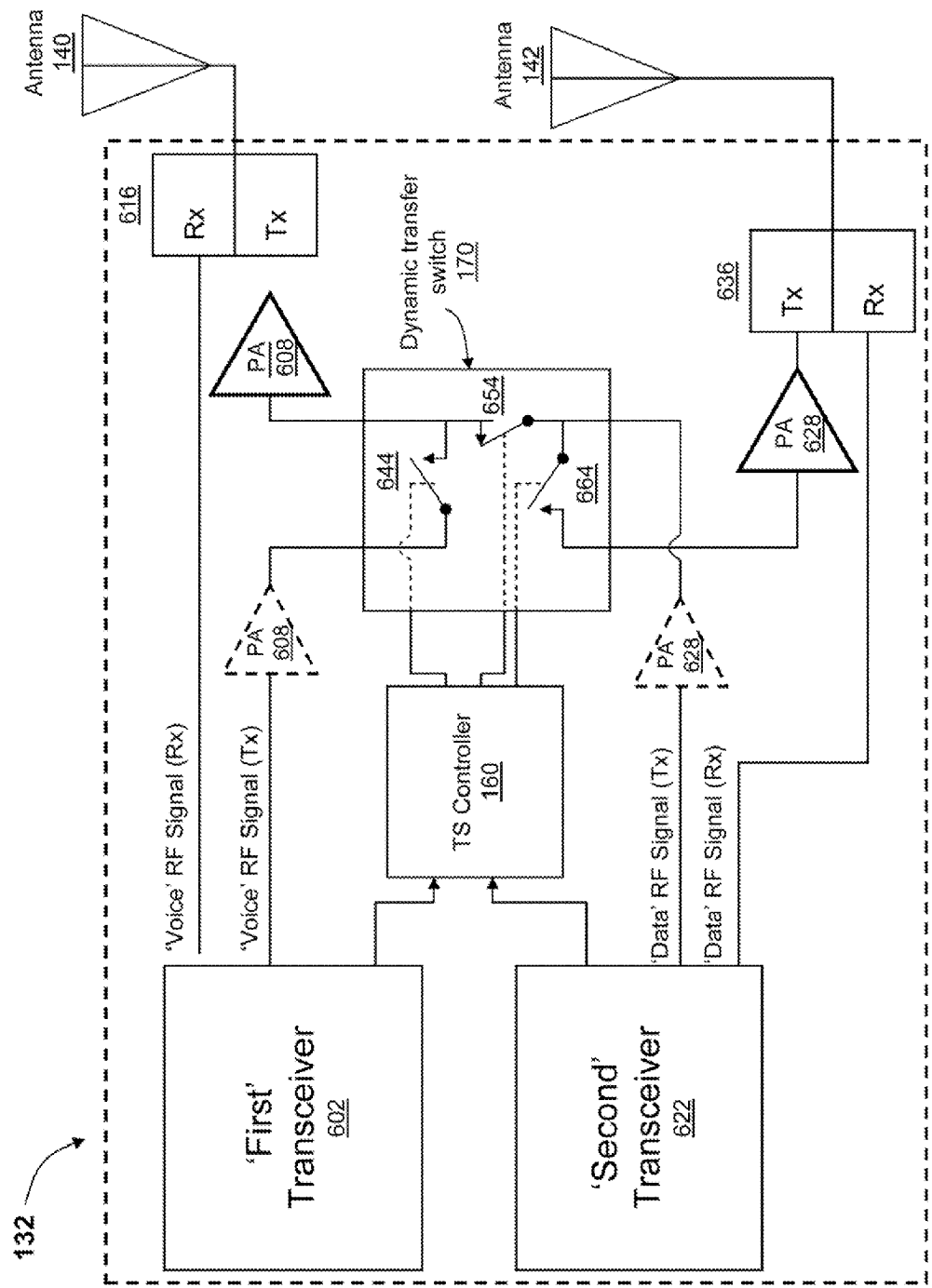
FIG. 6 is a block diagram illustrating a fourth embodiment of Radio Frequency Front End (RFFE) 132 comprising a dynamic transfer switch and a transfer switch controller within a wireless communication device.

Features, capabilities and functions of transfer switch controller 160 and dynamic transfer switch 170 are further described in the various configurations and embodiments provided in FIGS. 4-6. For example, in FIG. 4, transfer switch controller 160 communicatively couples a transceiver to a specific antenna by selectively biasing PIN diodes within dynamic transfer switch 170.

FIG. 4 is a block diagram illustrating a second embodiment of Radio Frequency Front End (RFFE) 132 comprising a dynamic transfer switch and a transfer switch controller which selectively configures the dynamic transfer switch, according to one embodiment. RFFE 132 comprises first transceiver 402 and second transceiver 422 which are both coupled electronically to transfer switch (TS) controller 160. In addition, RFFE 132 also comprises dynamic transfer switch 170 which is coupled to transfer switch controller 160 which provides control signals to dynamic transfer switch 170. In one embodiment, first transceiver 402 includes a first power amplifier (not shown) and a first duplexer (not shown) and second transceiver 422 includes a second power amplifier (not shown) and a second duplexer (not shown). Each of the first duplexer and the second duplexer has an input/output (I/O) port that is shared by transmit and receive signals. As illustrated in FIG. 4, first transceiver 402 provides a single RF signal port that is shared by both transmit and receive signals. In one embodiment, the single RF signal port (e.g., port 404) provided by first transceiver 402 is coupled to the (I/O) port of the first duplexer located within first transceiver 402. Similarly, the single RF signal port (e.g., port 407) provided by second transceiver 422 is coupled to the (I/O) port of the second duplexer located within second transceiver 422. In alternative embodiments, power amplifiers and duplexers are positioned outside of transceivers 402, 422, and between the dynamic transfer switch 170 and antennas 140, 142.

In the switch configuration of FIG. 4, dynamic transfer switch 170 comprises multiple circuit segments or paths including first switch path 440, second switch path 450 having a first ground termination, third switch path 460 providing a low impedance path, fourth switch path 470 providing a second ground termination and fifth switch path 480. The switch paths, i.e., 440, 450, 460, 470 and 480, are respectively illustrated using dashed lines or dotted lines. First switch path 440 comprises first direct current (dc) blocking capacitor 442, second (dc) blocking capacitor 446 and first PIN diode 444 which is coupled between first blocking capacitor 442 and second blocking capacitor 446. First blocking capacitor 442 and second blocking capacitor 446 collectively facilitate selective transmission of particular or desired high frequency signals along first switch path 440. Transfer switch controller 160 is coupled to first biasing component 448 and sends a voltage bias control signal to first biasing component 448 to selectively bias first PIN diode 444. First switch path 440 is coupled to first antenna 140 by second blocking capacitor 446.

Second switch path 450 includes ground termination 451 and second PIN diode 454 coupled between blocking capacitors 452 and 456. Ground termination 451 is coupled to blocking capacitor 452. In addition, first ground path 450 includes first phase shift component 459. First phase shift component 459 connects second switch path 450 to first switch path 440 and to first antenna 140. Transfer switch controller 160 is coupled to second biasing component 458 and sends a voltage bias control signal to second biasing component 458 to selectively bias second PIN diode 454. Second switch path 450 can be selectively configured (by applying a voltage bias control signal to second PIN diode 454) using second biasing component 458 to provide one of a low impedance ground path and a high impedance path. For example, when second PIN diode 454 is "ON", second switch path 450 provides a low impedance ground path. First phase shift component 459 converts the low impedance at the second switch to a high impedance at the first switch, enabling a low loss transmission from the output port 404 of the first transceiver 402 to the first antenna 140. When second PIN diode 454 is "OFF", second switch path 450 provides a high impedance path.

Third switch path 460 comprises first phase shift component 459 and second phase shift component 462. Each phase shift component provides approximately 90 degree phase shift to a propagating signal. As a result, a RF signal routed through the low impedance path undergoes a 180 degree phase shift. The low impedance path which connects first switch path 440 to fifth switch path 480 is coupled between first antenna 140 and an output port 407 of second transceiver 422. Third switch path 460 is a low loss path when second PIN diode 454 is "OFF", providing a high impedance path from the connection point of the first and second phase shift components 459, 462, and ground. Third path 460 is a high loss when diode 454 is "ON".

Fourth switch path/second ground path 470 comprises the same components that are included in first ground path 450, except for first phase shift component 459. However, second ground path 470 includes second phase shift component 462. Thus, as illustrated, second ground path 470 is configured in a manner similar to the configuration of first ground path 450. In particular, fourth ground path 470 includes ground termination 451 and second PIN diode 454 coupled between blocking capacitors 452 and 456. Ground termination 451 is coupled to blocking capacitor 452. In addition, second ground path 470 includes second phase shift component 462. Second phase shift component 462 connects fourth switch path/second ground path 470 to fifth switch path 480 and to second antenna 142. Fourth switch path/second ground path 470 can be selectively configured to provide one of a low impedance ground path and a high impedance path. For example, when second PIN diode 454 is "ON", fourth switch path 470 provides a low impedance ground path. Second phase shift component 462 converts a low impedance at the second switch to a higher impedance at the third switch, enabling a low loss transmission from the output port 407 of the second transceiver 422 to the second antenna 142. When second PIN diode 454 is "OFF", fourth switch path 470 provides a high impedance path, enabling a low loss transmission on path 460 from the output port 407 of the second transceiver 422 to the first antenna 140, via phase shifters 459 and 462. Fifth switch path 480 includes components that are similar to the components of first switch path 440, and as a result is similarly described. Fifth switch path 480 comprises third blocking capacitor 482, fourth blocking capacitor 486 and third PIN diode 484 which is coupled between third blocking capacitor 482 and fourth blocking capacitor 486. Third blocking capacitor 482 and fourth blocking capacitor 486 collectively facilitate selective transmission of particular high frequency signals along fifth switch path 480. Transfer switch controller 160 is coupled to third biasing component 488 and sends a voltage bias control signal to third biasing component 488 to selectively bias third PIN diode 484. Fifth switch path 480 is coupled to second antenna 142 by fourth blocking capacitor 486.

In the example of FIG. 4, in response to first antenna 140 being identified as the better performing antenna, transfer switch controller 160 propagates at least one voice signal from first transceiver 402 to first antenna 140 using first switch path 440 when first transceiver 402 is an exclusively operating voice transceiver within a voice-only operating/communication mode. In a simultaneous voice and data transmission mode in which first transceiver 402 operates as a voice transceiver and a second transceiver 422 operates as a data transceiver, transfer switch controller 160 communicatively couples first transceiver 402 to first antenna 140 using first switch path 440 and second transceiver 422 to second antenna 142 using fifth switch path 480. Thus in simultaneous voice and data mode, TS controller 160 controls bias circuits 448, 458 and 488 such that all of the diodes 444, 454 and 484 are biased in the "ON" state. Advantageously, diodes can have higher linearity in the "ON" state which serves to provide lower inter-modulation of the transmit signals from each transceiver 402, 422. More generally, transfer switch controller 160 communicatively couples an operating voice transceiver to a higher performing first antenna 140, and an operating data transceiver to a lower performing second antenna 142 by biasing each respective diode to an "ON" state in simultaneous voice and data mode.

In a data only mode in which a single data signal is propagated, transfer switch controller 160 biases each respective diode to an "OFF" state which enables second transceiver to propagate a data signal from second transceiver 422 to first antenna 140 via third switch path 460. In a simultaneous data only mode such as carrier aggregation, transfer switch controller 160 biases first PIN diode 444, second PIN diode 454 and third PIN diode 484 to a respective "ON" state. Consequently, first transceiver 402 operating as a first data transceiver propagates a first data signal to first antenna 140 via first switch path 440 and second transceiver 422 operating as a second data transceiver propagates a second data signal to second antenna 142 via fifth switch path 480.

Furthermore, transfer switch controller 160 utilizes a set of pre-established allowed control states (which can be provided by switch configuration data 114 (see FIG. 1) to determine how dynamic transfer switch 170 is configured for a specific operating mode. For example, states "ON:ON:ON" and/or "1:1:1" corresponding to first PIN diode 444, second PIN diode 454 and third PIN diode 484, respectively, represents the appropriate control states for dynamic transfer switch 170 to support simultaneous voice and data transmission as well as for carrier aggregation. By applying this set of control states, transfer switch controller 160 provides a highly linear switch having highly linear propagation paths for simultaneous voice and data transmission. More generally, a configuration in which dynamic transfer switch 170 is implemented utilizing a configuration of PIN diode switches provides a highly linear switch when employed in an operating mode in which at least one voice signal and at least one data signal is actively propagating within wireless communication device 100. States "OFF:OFF:OFF" and/or "0:0:0" corresponding to first PIN diode 444, second PIN diode 454 and third PIN diode 484, respectively, represents the appropriate control states for dynamic transfer switch 170 to support a single data signal transmission by the second transceiver 422 on a first antenna 140, the first antenna 140 being identified as the better performing antenna. In one embodiment, "ON:ON:OFF" or 1:1:0 represent another allowed set of states and can be configured in a voice only mode. Collectively, states "ON:ON:OFF" and states "ON:ON:ON" are represented by states "ON:ON:X", where "X" represents any one of an "ON" state and an "OFF" state and is referred to as a "Don't Care" state.

When dynamic transfer switch 170 is configured for simultaneous voice and data transmission or carrier aggregation, signals provided by first transceiver 402 and second transceiver 422 avoid second switch path 450 and fourth switch path 470 which are both configured as low impedance ground paths. RF signals provided by first transceiver 402 and second transceiver 422 avoid these low impedance paths because of the presence of phase shifters 459, 462. These phase shifters provide a phase shift of approximately 90 degrees and cause a corresponding ground path to be a relatively higher impedance path compared to a respective path for the transceiver signals to a corresponding antenna.

In one embodiment, transfer switch controller 160 applies to dynamic transfer switch 170 a control timing mechanism that utilizes a time window for switching transceiver connections to prevent the dynamic transfer switch from modifying a connection associated with at least one transceiver while a respective transceiver drive signal is actively propagating within elements of the dynamic transfer switch.

Transfer switch controller 160 provides the time window for switching transceiver connections by performing at least one of (a) executing a preset propagation delay of a respective transceiver drive signal and (b) modifying a respective transceiver connection prior to activation of a corresponding power amplifier.

Transfer switch controller 160 assigns a higher priority to a first transceiver connection that propagates a voice signal and a lower priority to a second transceiver connection that propagates a data signal. Based on the assigned priorities, transfer switch controller 160 substantially prevents the dynamic transfer switch from modifying the first transceiver connection while a voice signal is actively being propagated. Furthermore, transfer switch controller 160 substantially prevents the dynamic transfer switch from modifying the second transceiver connection while (a) a data signal is actively being propagated and (b) no higher priority signal requires an antenna that is already connected.

In one embodiment, in response to activation of an operating mode in which the first signal and the second signal occupy different frequency bands, transfer switch controller 160 uses dynamic transfer switch 170 to communicatively couple a first transceiver providing a first signal and a second transceiver providing a second signal to a same antenna (e.g., first antenna 140).

Transfer switch controller 160 configures dynamic transfer switch 170 to provide connections exclusively between transmitters of respective transceivers and selected antennas in order to propagate transmit signals via the dynamic transfer switch. Furthermore, transfer switch controller 160 provides a direct connection between a receiver and a corresponding antenna in order to bypass the dynamic transfer switch while propagating receive signals.

FIG. 5 is a block diagram illustrating a third embodiment of Radio Frequency Front End (RFFE) Module 132 comprising a dynamic transfer switch and a transfer switch controller which selectively configures the dynamic transfer switch, according to one embodiment. RFFE 132 comprises first transceiver 502 and second transceiver 522 which are both coupled electronically to transfer switch controller 160. In addition, RFFE 132 also comprises dynamic transfer switch 170 which is coupled to transfer switch controller 160 from which dynamic transfer switch 170 receives control signals. Additionally, RFFE 132 comprises first power amplifier 508 and second power amplifier 528. Unlike the illustrations of FIGS. 3 and 4 in which the respective power amplifiers (and corresponding duplexers) are included within the corresponding transceiver blocks (and, as a result are not shown), FIG. 5 provides a more detailed illustration of RFFE 132 in which first power amplifier 508 and second power amplifier 528 (and corresponding duplexers) are not included within the corresponding transceiver blocks and, as a result, are explicitly shown. In addition, RFFE 132 comprises first duplexer 516 and second duplexer 536. First duplexer 516 provides a first receive filter within a first receive signal path and a first transmit filter within a first transmit signal path. Similarly, second duplexer 536 provides a second receive filter within a second receive signal path and a second transmit filter within a second transmit signal path. First duplexer 516 is coupled to first antenna 140 and second duplexer 536 is coupled to second antenna 142. As illustrated, first power amplifier 508 is communicatively coupled to corresponding transmit filter of first duplexer 516 and second power amplifier 528 is coupled to the corresponding transmit filter of second duplexer 536. Also illustrated in RFFE 132 are alternative circuit positions for first power amplifier 508 and second power amplifier 528. These alternative positions which place each of the power amplifiers between a respective transceiver and dynamic transfer switch 170 are indicated with dashed line outline representations for first power amplifier 508 and second power amplifier 528.

In the switch configuration of FIG. 5, dynamic transfer switch 170 comprises multiple switch paths including a first switch path provided by first switch device 544, a second switch path which includes second switch device 554 and third switch device 564, and a third switch path provided by fourth switch device 574.

In the first switch path, first switch device 544 is coupled (at a first lead of switch device 544) to first transceiver 502 and (at a second lead of switch device 544) to an input port of first power amplifier 508. In the second switch path, second switch device 554 is coupled to an input port of first power amplifier 508 and to third switch device 564. In addition to being connected to second switch device 554, third switch device 564 is coupled to second transceiver 522. In the third switch path, fourth switch device 574 is coupled to an input port of second power amplifier 528 and to third switch device 564 at an output port of second transceiver 522.

The transfer switch controller 160 identifies a first antenna as a better performing antenna among the at least two antennas based on performance characteristics. In a first embodiment (as described in FIG. 3), transfer switch controller 160 determines a better performing antenna by evaluating signal propagation characteristics of both antennas in real time, and transfer switch controller 160 configures dynamic transfer switch 170 to enable higher priority signals to be propagated using the better performing antenna. The transfer switch controller 160 can dynamically determine a better performing antenna based on knowledge of the user position with respect to the antenna 140, 142, which can be inferred from the presently running applications. For example, the transfer switch controller 160 can determine a particular antenna is a better performing antenna if a voice call is presently running and the user is inferred to be in a talking position as a result of the earpiece speaker being active. Alternatively the transfer switch controller 160 can determine which antenna is a better performing based on position sensor data. In another embodiment (as illustrated in FIG. 5), transfer switch controller 160 identifies an antenna that is pre-established as a better performing antenna from among at least two antennas and configures dynamic transfer switch 170 to enable higher priority signals to be propagated using a pre-established better performing antenna. In the configuration of FIG. 5, first antenna 140 is pre-established as the better performing antenna from among first antenna 140 and second antenna 142.

In response to first antenna 140 being identified as the better performing antenna, if the current operating mode provides only a voice signal type for each of the associated communication signals, transfer switch controller 160 propagates all of the at least one communication signal using first antenna 140. For example, in a voice-only transmission mode in which a single RF voice signal is provided by a single transceiver (e.g., first transceiver 502), first transceiver 502 operates as a voice transceiver providing the single RF voice signal which transfer switch controller 160 propagates to first antenna 140 using the first switch path provided by first switch device 544. In a first simultaneous voice-only transmission mode in which at least two independent RF voice signals are provided by a single transceiver (e.g., first transceiver 502), first transceiver 502, operates as a voice transceiver, providing the at least two independent RF voice signals which transfer switch controller 160 propagates to first antenna 140 using first switch device 544. In a second simultaneous voice-only transmission mode in which each of first transceiver 502 and second transceiver 522 operates as a corresponding voice transceiver that respectively transmits at least one RF voice signal, transfer switch controller 160 communicatively couples (a) first transceiver 502 to first antenna 140 using first switch device 544 and (b) second transceiver 522 to first antenna 140 using the second switch path. The second switch path includes second switch device 554 and third switch device 564.

In response to determining that the operating mode initiated provides only a data signal type and is not identified as carrier aggregation, transfer switch controller 160 propagates all of the at least one communication signal using first antenna 140. For example, second transceiver 522 exclusively operating as a data transceiver is able to propagate, using dynamic transfer switch 170, a single data signal in a single data signal mode or at least two data signals in a simultaneous data signal mode to first antenna 140 using the second switch path. The second switch path includes second switch device 554 and third switch device 564. However, in response to determining that the operating mode initiated provides only a data signal type and is identified as carrier aggregation, transfer switch controller 160 communicatively couples first transceiver 502 (i.e., operating as a first data transceiver) to first antenna 140 to propagate a first data signal(s) having a higher priority (relative to a second data signal) to first antenna 140 using first switch device 544. Furthermore, transfer switch controller 160 communicatively couples second transceiver 522 (i.e., operating as a second data transceiver) to second antenna 142 to propagate a second data signal(s) having a lower priority to second antenna 142 providing a lower antenna performance using the third switch path that is provided by fourth switch device 574.

FIG. 6 is a block diagram illustrating a fourth embodiment of Radio Frequency Front End (RFFE) Module 132 comprising a dynamic transfer switch and a transfer switch controller which selectively configures the dynamic transfer switch, according to one embodiment. RFFE 132 comprises first transceiver 602 and second transceiver 622 which are both coupled electronically to transfer switch (TS) controller 160. In addition, RFFE 132 also comprises dynamic transfer switch 170 which is coupled to transfer switch controller 160 from which dynamic transfer switch 170 receives control signals. Additionally, RFFE 132 comprises first power amplifier 608 and second power amplifier 628. In addition, RFFE 132 comprises first duplexer 616 and second duplexer 636. First duplexer 616 provides a first receive filter within a first receive signal path and a first transmit filter along a first transmit signal path. Similarly, second duplexer 636 provides a second receive filter within a second receive signal path and a second transmit filter along a second transmit signal path. First duplexer 616 is coupled to first antenna 140 and second duplexer 636 is coupled to second antenna 142. As illustrated, first power amplifier 608 is communicatively coupled to corresponding transmit filter of first duplexer 616 and second power amplifier 628 is coupled to the corresponding transmit filter of second duplexer 636. Also illustrated in RFFE 132 are alternative circuit positions for first power amplifier 608 and second power amplifier 628. These alternative positions which place each of the power amplifiers between a respective transceiver and dynamic transfer switch 170 are indicated with dashed line outline representations for first power amplifier 608 and second power amplifier 628.

In the switch configuration of FIG. 6, dynamic transfer switch 170 comprises multiple switch paths including a first switch path provided by first switch device 644, a second switch path provided by second switch device 654, and a third switch path provided by third switch device 664. In the first switch path, first switch device 644 is coupled to first transceiver 602 and to an input port of first power amplifier 608. In the second switch path, second switch device 654 is coupled to an input port of first power amplifier 608 and also to second transceiver 622. In the third switch path, third switch device 664 is coupled to an input port of second power amplifier 628 and also to second transceiver 622.

In the switch configuration of FIG. 6, first antenna 140 is pre-established as the better performing antenna from among first antenna 140 and second antenna 142. Consequently, transfer switch controller 160 configures dynamic transfer switch 170 to enable higher priority signals to be propagated using first antenna 140 which is pre-determined to be a better performing antenna.

In response to first antenna 140 being identified as the better performing antenna and in response to the current operating mode providing only a voice signal type for each of the associated communication signals, transfer switch controller 160 propagates all of at least one voice signal using first antenna 140. For example, in a voice-only transmission mode in which a single RF voice signal is provided by a single transceiver (e.g., first transceiver 602), first transceiver 602 operates as a voice transceiver providing the single RF voice signal which transfer switch controller 160 propagates to first antenna 140 using the first switch path provided first switch device 644. In a first simultaneous voice-only transmission mode in which at least two independent RF voice signals are provided by a single transceiver (e.g., first transceiver 602), first transceiver 602 operates as a voice transceiver providing the at least two independent RF voice signals which transfer switch controller 160 propagate to first antenna 140 using first switch device 644. In a second simultaneous voice-only transmission mode in which each of first transceiver 602 and second transceiver 622 operates as a corresponding voice transceiver that respectively transmits at least one RF voice signal, transfer switch controller 160 communicatively couples (a) first transceiver 602 to first antenna 140 using first switch device 644 and (b) second transceiver 622 to first antenna 140 using the second switch path which is provided by second switch device 654. In the second simultaneous voice-only transmission mode, transfer switch controller 170 configures an open circuit within the third switch path. This open circuit is provided by placing third switch device 664 in an open position. As a result, second transceiver 622 is communicatively coupled only to first antenna 140.

In response to determining that the operating mode initiated provides only a data signal type and is not identified as carrier aggregation, transfer switch controller 160 propagates all of the at least one communication signal using first antenna 140. For example, second transceiver 622 exclusively operating as a data transceiver is able to propagate, using dynamic transfer switch 170, a single data signal in a single data signal mode or at least two data signals in a simultaneous data signal mode to first antenna 140 using the second switch path which is provided by second switch device 654. However, in response to determining that the operating mode initiated provides only a data signal type and is identified as carrier aggregation, transfer switch controller 160 communicatively couples first transceiver 602 (i.e., operating as a first data transceiver) to first antenna 140 to propagate a first data signal(s) to first antenna 140 using first switch device 644. Furthermore, transfer switch controller 160 communicatively couples second transceiver 622 (i.e., operating as a second data transceiver) to second antenna 142 to propagate a second data signal(s) to second antenna 142 using the third switch path that is provided by third switch device 664.

Figure 7:
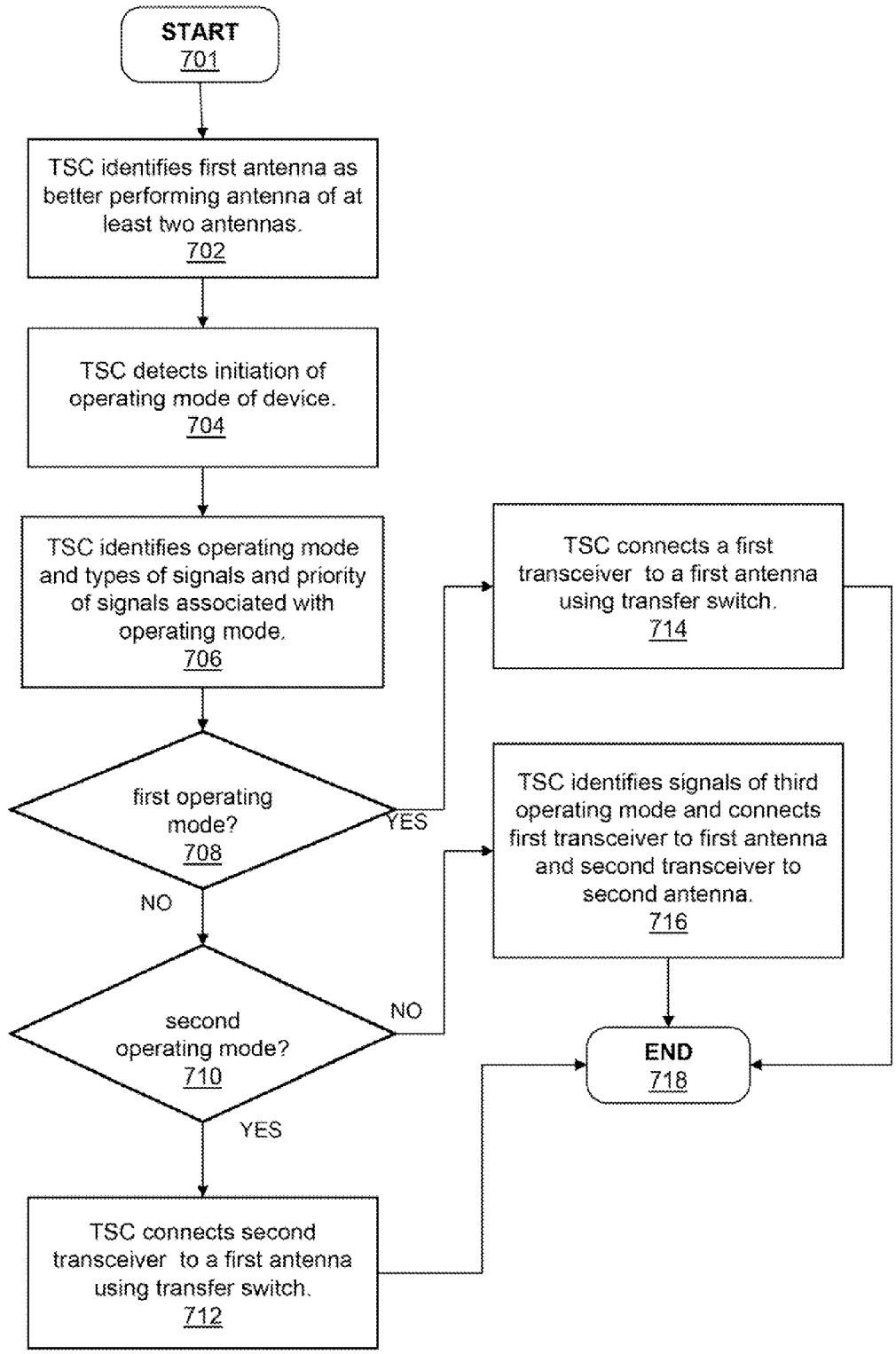
FIG. 7 is a flow chart illustrating one embodiment of a method for communicatively coupling a transceiver to an antenna based on an operating mode and an antenna performance.
Figure 8:
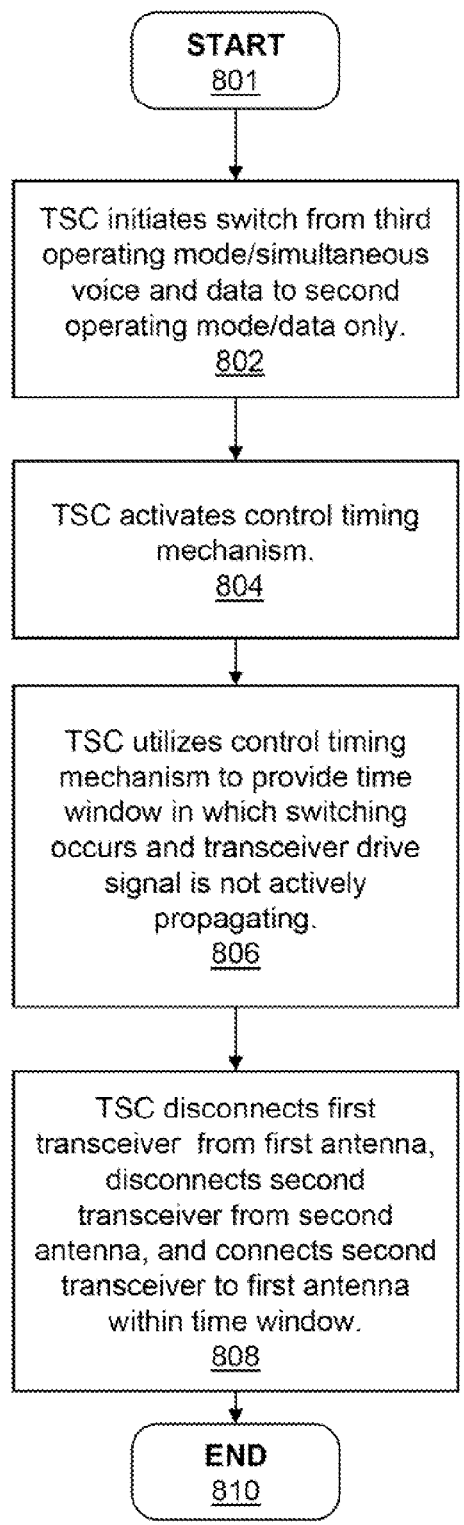
FIG. 8 is a flow chart illustrating one embodiment of a method for reconfiguring the dynamic transfer switch using a control timing mechanism within a wireless communication device.

FIGS. 7 and 8 are flow charts illustrating embodiments of the methods by which the above processes of the illustrative embodiments can be implemented. Specifically, FIG. 7 illustrates one embodiment of a method for communicatively coupling a transceiver to an antenna based on an operating mode and an antenna performance. FIG. 8 illustrates one embodiment of a method for reconfiguring the dynamic transfer switch using a control timing mechanism. Although the methods illustrated by FIGS. 7 and 8 may be described with reference to components and functionality illustrated by and described in reference to FIGS. 1-6, it should be understood that this is merely for convenience and alternative components and/or configurations thereof can be employed when implementing the method. Certain portions of the methods may be completed by DTS utility 167 executing on one or more processors (processor 105 or DSP 128) within wireless communication device 100 (FIG. 1), or a processing unit or transfer switch controller 160 of RFFE 132 (FIG. 1). The executed processes then control specific operations of or on RFFE 132. For simplicity in describing the method, all method processes are described from the perspective of RFFE 132 and specifically transfer switch controller 160.

The method of FIG. 7 begins at start block 701 and proceeds to block 702 at which transfer switch controller 160 identifies first antenna 140 as the better performing antenna of at least two antennas. At block 704, transfer switch controller 160 detects initiation of an operating mode of wireless communication device 100. At block 706, transfer switch controller 160 identifies the types of communication signals and corresponding priorities of communication signals associated with the operating mode initiated. For example, the first type of communication signal is the highest priority signal type and the second type of communication signal type is the lower priority signal type, etc.

At decision block 708, transfer switch controller 160 determines whether a pre-defined first operating mode which provides corresponding types of communication signals and respective signal priorities is initiated. In particular, the pre-defined first operating mode is a voice-only communication mode in which a single voice transceiver is operating. If, at decision block 708, transfer switch controller 160 determines that the pre-defined first operating mode is initiated, transfer switch controller 160 connects first transceiver 302 to first antenna 140 using dynamic transfer switch 170, as shown at block 714. In particular, the pre-defined first operating mode is a single voice communication mode or a single data communication mode in which a first transceiver 302 is operating. However, if at decision block 708 transfer switch controller 160 determines that the pre-defined first operating mode has not been initiated, transfer switch controller 160 determines whether a pre-defined second operating mode which provides corresponding types of communication signals and respective signal priorities is initiated, as shown at decision block 710. In particular, the pre-defined second operating mode is a data-only communication mode in which second transceiver 322 is operating. If at decision block 710 transfer switch controller 160 determines that the pre-defined second operating mode is initiated, transfer switch controller 160 connects second transceiver 322 to first antenna 140 using dynamic transfer switch 170, as shown at block 712. However, if at decision block 710 transfer switch controller 160 determines that the pre-defined second operating mode has not been initiated, transfer switch controller 160 determines that a pre-defined third operating mode has been initiated and communicatively couples first transceiver 302 and second transceiver 322 to first antenna 140 and second antenna 142, respectively, as shown at block 716. In particular, the pre-defined third operating mode is a simultaneous voice and data communication mode in which a voice transmitter provided by first transceiver 302 and a data transmitter provided by second transceiver 322 are actively operating.

In one embodiment, carrier aggregation is a fourth operating mode that can be activated in wireless communication device 100. Carrier aggregation is a data-only mode in which a first data transmitter provided by first transceiver 302 and a second data transmitter provided by second transceiver 322 are actively operating. In response to determining that a carrier aggregation mode has been initiated, transfer switch controller 160 communicatively couples first transceiver 302 to first antenna 140 and second transceiver 322 to second antenna 142. The process ends at block 718.

The method of FIG. 8 begins at start block 801 and proceeds to block 802 at which transfer switch controller 160 initiates a switch from a third operating mode, simultaneous voice and data mode, to a second operating mode, data-only mode. At block 804, transfer switch controller 160 activates a control timing mechanism. At block 806, transfer switch controller 160 utilizes the control timing mechanism to appropriately determine/provide a time window. During the time window, (a) switching of transceiver connections can occur and (b) a respective transceiver drive signal is not actively propagating. At block 808, transfer switch controller 160 disconnects first transceiver 302 (e.g., a voice transceiver) from first antenna 140, disconnects second transceiver 322 (e.g., a data transceiver) from second antenna 142, and connects second transceiver 322 to first antenna 140 within the time window. The process ends at block 810.

The flowcharts and block diagrams in the various figures presented and described herein illustrate the architecture, functionality, and operation of possible implementations of systems, methods and computer program products according to various embodiments of the present disclosure. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Thus, while the method processes are described and illustrated in a particular sequence, use of a specific sequence of processes is not meant to imply any limitations on the disclosure. Changes may be made with regards to the sequence of processes without departing from the spirit or scope of the present disclosure. Use of a particular sequence is therefore, not to be taken in a limiting sense, and the scope of the present disclosure extends to the appended claims and equivalents thereof.

In some implementations, certain processes of the methods are combined, performed simultaneously or in a different order, or perhaps omitted, without deviating from the spirit and scope of the disclosure. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A method for selecting an antenna for signal propagation within a wireless communication device having a plurality of transceivers and at least two antennas, the method comprising:
   identifying, by a controller, a first antenna of the at least two antennas having better current antenna performance characteristics than a second antenna of the at least two antennas;
   determining each type of communication signal associated with an operating mode initiated on the wireless communication device, wherein each operating mode has at least one communication signal and each communication signal is one of a plurality of different types of communication signal and each type of communication signal is assigned a relative priority;
   in response to determining that the operating mode initiated provides a single communication signal, selectively connecting, by a dynamic transfer switch, the transceiver for propagating the single communication signal to the first antenna; and
   in response to determining that the operating mode initiated provides at least two different types of communication signals having different priorities and identifying the first antenna having better current antenna performance characteristics than the second antenna, selectively connecting, by the dynamic transfer switch, one of the plurality of transceivers for propagating a first communication signal of a first type to the first antenna having better performance characteristics and one of the plurality of transceivers for propagating a second communication signal of a second type to the second antenna, wherein the first type of communication signal is different from and has a higher priority than the second type of communication signal.

2. The method of claim 1, further comprising:
detecting initiation of a specific operating mode among a plurality of known operating modes;
in response to detecting initiation of the specific operating mode, configuring, based on the specific operating mode, the dynamic transfer switch to select a specific antenna providing desired performance to support propagation of each type of communication signal associated with the specific operating mode;
communicatively connecting, utilizing the configured dynamic transfer switch, each of at least one transceiver utilized to support the specific operating mode to a specific antenna, wherein each transceiver includes a transmitter and supports propagation of a specific type of communication signal;
in response to the specific operating mode providing a single communication signal, selecting the first antenna via the dynamic transfer switch and propagating the single communication signal using only the first antenna; and
in response to the specific operating mode involving one of simultaneous voice and data signal transmission and carrier aggregation, which provides at least two communication signals from respective transceivers, selectively propagating at least a first communication signal using the first antenna and selectively propagating at least a second communication signal using the second antenna.

3. The method of claim 2, further comprising:
preventing the dynamic transfer switch from modifying a connection associated with at least one transceiver while a respective transceiver drive signal is actively propagating within elements of the dynamic transfer switch, wherein the preventing is performed by an application of a control timing mechanism that utilizes a time window for switching transceiver connections.

4. The method of claim 3, wherein said preventing further comprises:
performing at least one of (a) executing a preset propagation delay of a respective transceiver drive signal and (b) modifying a respective transceiver connection prior to activation of a corresponding power amplifier, wherein said performing provides the time window for switching transceiver connections, wherein said time window occurs when a corresponding transceiver drive signal is not actively being propagated.

5. The method of claim 2, further comprising:
assigning a higher priority to a first transceiver connection that propagates a voice signal and a lower priority to a second transceiver connection that propagates a data signal, wherein said assigning of the higher priority substantially prevents the dynamic transfer switch from modifying the first transceiver connection while a voice signal is actively being propagated, and wherein said assigning of the lower priority prevents the dynamic transfer switch from modifying the second transceiver connection while (a) a data signal is actively being propagated and (b) no higher priority signal requires an antenna that is already connected.

6. The method of claim 2, wherein:
the dynamic transfer switch is implemented utilizing a configuration of PIN diode switches that provide a highly linear switch when employed in an operating mode in which at least one voice signal and at least one data signal is actively propagating within the wireless communication device.

7. A method for selecting an antenna for signal propagation within a wireless communication device having a plurality of transceivers and at least two antennas, the method comprising:

identifying, by a controller, a first antenna of the at least two antennas having better current antenna performance characteristics than a second antenna of the at least two antennas;

determining each type of communication signal associated with an operating mode initiated on the wireless communication device, wherein each operating mode has at least one communication signal and each communication signal is one of a plurality of different types of communication signal and each type of communication signal is assigned a relative priority;

in response to determining that the operating mode initiated provides a single communication signal, a dynamic transfer switch selectively connecting the transceiver propagating the single communication signal to the first antenna;

in response to determining that the operating mode initiated provides at least two different types of communication signals having different priorities and the first antenna having better current antenna performance characteristics than the second antenna, the dynamic transfer switch selectively connecting one of the plurality of transceivers propagating a first communication signal of a first type to the first antenna, the first communication signal of the first type having a higher priority than a second communication signal of a second and different type, and the dynamic transfer switch selectively connecting one of the plurality of transceivers propagating the second communication signal the second antenna;

in response to activation of an operating mode in which a first signal and a second signal occupy different frequency bands, connecting to a same antenna, utilizing the dynamic transfer switch, a first transceiver providing the first signal and a second transceiver providing the second signal;

wherein the dynamic transfer switch provides connections exclusively between transmitters of respective transceivers and selected antennas in order to propagate transmit signals via the dynamic transfer switch; and providing, between a receiver and a corresponding antenna, a direct connection for propagating receive signals, wherein said direct connection bypasses the dynamic transfer switch.

8. A radio frequency front end (RFFE) comprising:
at least two antennas;
at least two transceivers;
a dynamic transfer switch connected to the at least two antennas and the at least two transceivers; and
a transfer switch controller coupled to the dynamic transfer switch and which:
identifies a first antenna of the at least two antennas having better current antenna performance characteristics than a second antenna of the at least two antennas;
determines each type of communication signal associated with an operating mode initiated on the wireless communication device, wherein each operating mode has at least one communication signal and each communication signal is one of a plurality of different types of communication signal and each type of communication signal is assigned a relative priority;

in response to determining that the operating mode initiated provides a single communication signal, selectively controls the dynamic transfer switch to connect a transceiver of the at least two transmitters transmitting the single communication signal to the first antenna; and in response to determining that the operating mode initiated provides at least two different types of communication signals and identifying the first antenna having better current antenna performance characteristics than the second antenna, selectively controls the dynamic transfer switch to connect a transceiver of the least two transceivers for transmitting a communication signal of a first type to the first antenna having better performance characteristics, and to connect a transceiver of the least two transceivers for transmitting a second communication signal the second antenna, wherein the first type of communication signal is different from and has a higher priority than the second type of communication signal.

9. The RFFE of claim 8, wherein the transfer switch controller:

detects initiation of a specific operating mode among a plurality of known operating modes;

in response to detecting initiation of the specific operating mode, configures, based on the specific operating mode, the dynamic transfer switch to select a specific antenna providing desired performance to support propagation of each type of communication signal associated with the specific operating mode;

communicatively connects, utilizing the configured dynamic transfer switch, each of at least one transceiver utilized to support the specific operating mode to a specific antenna, wherein each transceiver includes a transmitter and supports propagation of a specific type of communication signal;

in response to the specific operating mode providing a single communication signal, selects the first antenna via the dynamic transfer switch and propagates the single communication signal using the first antenna; and in response to the specific operating mode involving one of simultaneous voice and data signal transmission and carrier aggregation, which provides at least two communication signals from respective transceivers, selectively propagates at least a first communication signal using the first antenna and selectively propagates at least a second communication signal using the second antenna.

10. The RFFE of claim 9, wherein the transfer switch controller:

prevents the dynamic transfer switch from modifying a connection associated with at least one transceiver while a respective transceiver drive signal is actively propagating within elements of the dynamic transfer switch, wherein the preventing is performed by an application of a control timing mechanism that utilizes a time window for switching transceiver connections.

11. The RFFE of claim 10, wherein the transfer switch controller:

performs at least one of (a) executing a preset propagation delay of a respective transceiver drive signal and (b) modifying a respective transceiver connection prior to activation of a corresponding power amplifier, wherein said performing provides the time window for switching transceiver connections, wherein said time window occurs when a corresponding transceiver drive signal is not actively being propagated.

12. The RFFE of claim 9, wherein the transfer switch controller:

assigns a higher priority to a first transceiver connection that propagates a voice signal and a lower priority to a second transceiver connection that propagates a data signal, wherein said assigning of the higher priority substantially prevents the dynamic transfer switch from modifying the first transceiver connection while a voice signal is actively being propagated, and wherein said assigning of the lower priority prevents the dynamic transfer switch from modifying the second transceiver connection while (a) a data signal is actively being propagated and (b) no higher priority signal requires an antenna that is already connected.

13. The RFFE of claim 9, wherein the transfer switch controller:

implements the dynamic transfer switch utilizing a configuration of PIN diode switches that provide a highly linear switch when employed in an operating mode in which at least one voice signal and at least one data signal is actively propagating within the wireless communication device.

14. The RFFE of claim 9, wherein the transfer switch controller:

in response to activation of an operating mode in which a first signal and a second signal occupy different frequency bands, connects to a same antenna, utilizing the dynamic transfer switch, a first transceiver providing the first signal and a second transceiver providing the second signal;

wherein the dynamic transfer switch provides connections exclusively between transmitters of respective transceivers and selected antennas in order to propagate transmit signals via the dynamic transfer switch; and provides between a receiver and a corresponding antenna, a direct connection for propagating receive signals, wherein said direct connection bypasses the dynamic transfer switch.

15. A wireless communication device having a radio frequency front end (RFFE) which includes:

at least one processor;
at least two antennas;
at least two transceivers;
a dynamic transfer switch connected to the at least two antennas and the at least two transceivers; and
a transfer switch controller coupled to the dynamic transfer switch and which:

identifies a first antenna of the at least two antennas having better current antenna performance characteristics than a second antenna of the at least two antennas;

determines each type of communication signal associated with an operating mode initiated on the wireless communication device, wherein each operating mode has at least one communication signal and each communication signal is one of a plurality of different types of communication signal and each type of communication signal is assigned a relative priority;

in response to determining that the operating mode initiated provides a single communication signal, selectively controls the dynamic transfer switch to connect a transceiver of the at least two transmitters transmitting the single communication signal to the first antenna; and in response to determining that the operating mode initiated provides at least two different types of communication signals and identifying the first antenna having better current antenna performance characteristics than the second antenna, selectively controls the dynamic transfer switch to connect a transceiver of the at least two transceivers for transmitting a first communication signal of a first type to the first antenna having better performance characteristics and to connect a transceiver of the at least two transceivers for transmitting a second communication signal the second antenna, wherein the first type of communication signal is different from and has a higher priority than the second type of communication signal.

16. The wireless communication device of claim 15, wherein the transfer switch controller:

detects initiation of a specific operating mode among a plurality of known operating modes;

in response to detecting initiation of the specific operating mode, configures, based on the specific operating mode, the dynamic transfer switch to select a specific antenna providing desired performance to support propagation of each type of communication signal associated with the specific operating mode;

communicatively connects, utilizing the configured dynamic transfer switch, each of at least one transceiver utilized to support the specific operating mode to a specific antenna, wherein each transceiver includes a transmitter and supports propagation of a specific type of communication signal;

in response to the specific operating mode providing a single communication signal, selects the first antenna via the dynamic transfer switch and propagates the single communication signal using the first antenna; and in response to the specific operating mode involving one of simultaneous voice and data signal transmission and carrier aggregation, which provides at least two communication signals from respective transceivers, selectively propagates at least a first communication signal using the first antenna and selectively propagates at least a second communication signal using the second antenna.

17. The wireless communication device of claim 16, wherein the transfer switch controller:

prevents the dynamic transfer switch from modifying a connection associated with at least one transceiver while a respective transceiver drive signal is actively propagating within elements of the dynamic transfer switch, wherein the preventing is performed by an application of a control timing mechanism that utilizes a time window for switching transceiver connections, wherein said preventing is performed by at least one of (a) executing a preset propagation delay of a respective transceiver drive signal and (b) modifying a respective transceiver connection prior to activation of a corresponding power amplifier, wherein said performing provides the time window for switching transceiver connections, wherein said time window occurs when a corresponding transceiver drive signal is not actively being propagated.

18. The wireless communication device of claim 16, wherein the transfer switch controller:

assigns a higher priority to a first transceiver connection that propagates a voice signal and a lower priority to a second transceiver connection that propagates a data signal, wherein said assigning of the higher priority substantially prevents the dynamic transfer switch from modifying the first transceiver connection while a voice signal is actively being propagated, and wherein said assigning of the lower priority prevents the dynamic transfer switch from modifying the second transceiver connection while (a) a data signal is actively being propagated and (b) no higher priority signal requires an antenna that is already connected.

19. The wireless communication device of claim 16, wherein the transfer switch controller:
   implements the dynamic transfer switch utilizing a configuration of PIN diode switches that provide a highly linear switch when employed in an operating mode in which at least one voice signal and at least one data signal is actively propagating within the wireless communication device.

20. The wireless communication device of claim 16, wherein the transfer switch controller:
   in response to activation of an operating mode in which a first signal and a second signal occupy different frequency bands, connects to a same antenna, utilizing the dynamic transfer switch, a first transceiver providing the first signal and a second transceiver providing the second signal;
   wherein the dynamic transfer switch provides connections exclusively between transmitters of respective transceivers and selected antennas in order to propagate transmit signals via the dynamic transfer switch; and
   provides between a receiver and a corresponding antenna, a direct connection for propagating receive signals, wherein said direct connection bypasses the dynamic transfer switch.

\* \* \* \* \*

UNITED STATES PATENT AND TRADEMARK OFFICE
CERTIFICATE OF CORRECTION

PATENT NO. : 9,118,394 B2
APPLICATION NO. : 13/716319
DATED : August 25, 2015
INVENTOR(S) : Black et al.

Page 1 of 1

It is certified that error appears in the above-identified patent and that said Letters Patent is hereby corrected as shown below:

In the Claims:

In Claim 7, Column 21, Line 36 please insert the word --to-- between "signal" and "the"

In Claim 8, Column 22, Lines 19-20 please insert the word --to-- between "signal" and "the"

Signed and Sealed this
First Day of March, 2016

Michelle K. Lee
*Director of the United States Patent and Trademark Office*